United States Patent Office 3,001,900
Patented Sept. 26, 1961

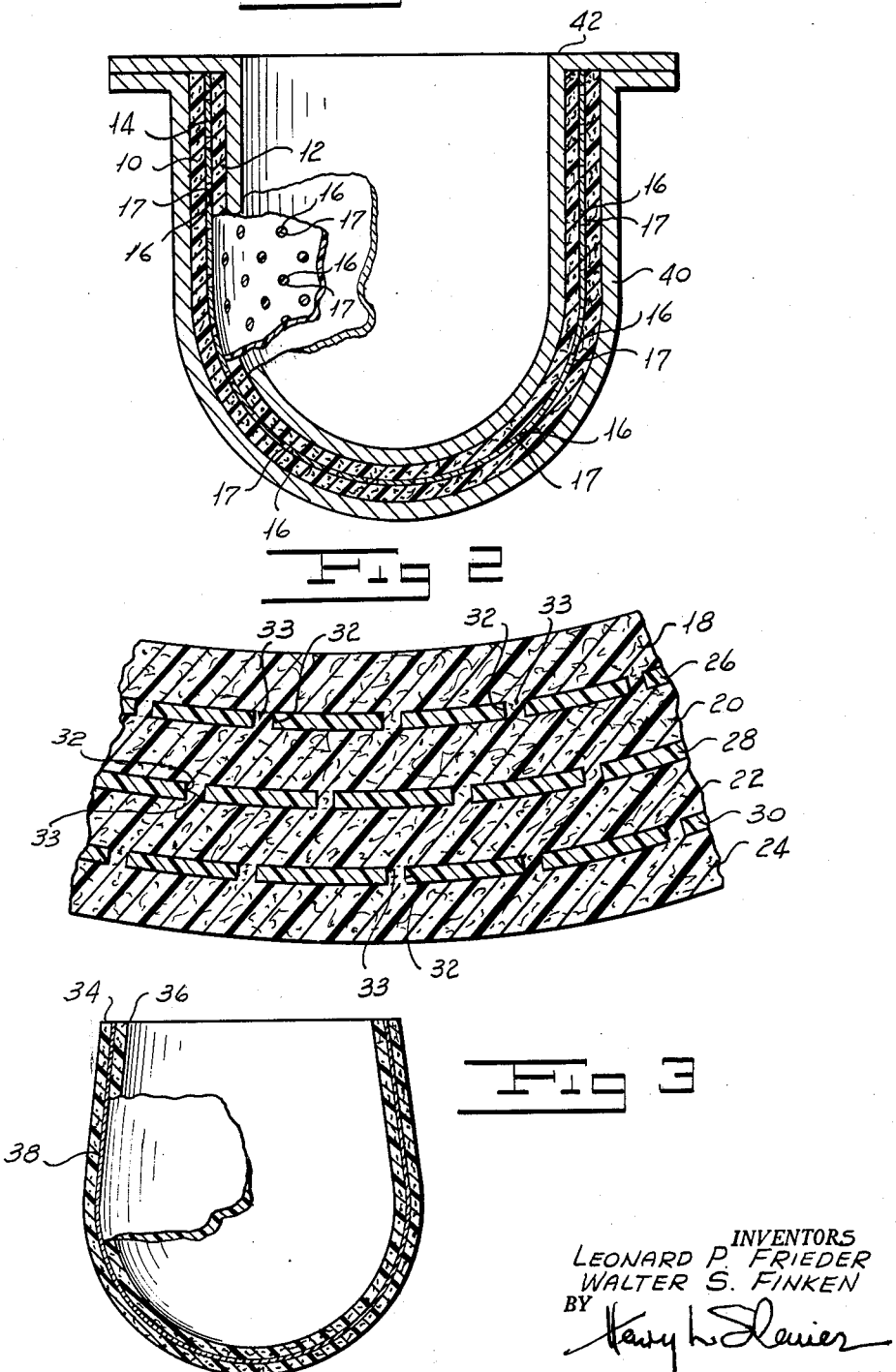

3,001,900
LAMINATED PLASTIC ARTICLE
Leonard P. Frieder, 145 Station Road, Great Neck, N.Y., and Walter S. Finken, Brooklyn, N.Y.; said Finken assignor to said Frieder
Filed May 19, 1954, Ser. No. 430,938
9 Claims. (Cl. 154—52.5)

Our invention relates to an improvement in laminated plastic articles and more particularly to an improved laminated plastic article and method of forming the same.

Metal armor has long been employed to protect personnel and materiel from injury resulting from flying fragments and missiles such as bullets and the like. This armor, however, suffers from a number of disadvantages. When employed as body armor to protect the person, it is extremely uncomfortable since it is heavy and is a good conductor of heat. Because it is rigid, it affords little freedom of movement. It is, moreover, difficult to form into shapes where it may conveniently be used as body armor. When used to form storage containers for protecting equipment, metal is too heavy to be practical for many uses. Owing to their liability to corrosion, such metal containers must themselves be protected. As a consequence, laminated plastic armors have been developed to replace metal armors. In our copending application, Serial No. 265,598, filed January 9, 1952, now Patent No. 2,778,761, we have disclosed a laminated plastic assembly for use as such an armor.

We have developed a laminated plastic article and method of forming the same which represent an improvement over the laminated plastic assembly shown in our said copending application, Serial No. 265,598. The improved article is extremely light in weight and is less bulky than similar articles formed of plastic armors of the prior art. Even so, our laminated plastic possesses improved ballistic properties. Then, too, it is provided with a barrier to the passage of vapor through the plastic assembly forming the article. We have also invented a method of forming and curing a number of laminates simultaneously to form an article which is resistant to penetration by flying fragments and missiles.

One object of our invention is to provide a laminated plastic article which is resistant to penetration by flying fragments, missiles, and the like.

Another object of our invention is to provide a laminated plastic article which is light in weight and which is less bulky than similar laminated plastic articles of the prior art.

Still another object of our invention is to provide a laminated plastic article provided with a barrier to the passage of vapor through the article wall.

A further object of our invention is to provide a method of forming an article which is resistant to penetration by flying fragments, missiles, and the like.

Yet another object of our invention is to provide a method of forming a laminated plastic article by molding and curing a number of plastic laminates simultaneously.

Other and further objects of our invention will appear from the following description.

In general, our invention contemplates the provision of a laminated plastic article formed from at least a pair of hard layers each comprising a fibrous material impregnated with a suitable plastic. We dispose a thin film of non-adherent material between the layers or laminates and cure the assembly at once. This film or films prevents the formation of a continuous bond over the surface between laminates during curing to ensure that laminates may shift relative to one another when subjected to forces resulting from the impact of a flying fragment or projectile or the like on the surface of the finished article. The film may be any impervious material which is flexible, non-adherent and nonfusible at curing temperatures. When it is desired to bond the laminates one to another at spaced points, we perforate this film. Plastic seeps through the perforations during the forming and curing of the article to provide bonds over a minor portion of the surface between the laminates when the curing process is complete. If the article to be formed has a re-entrant cross section, no bonds may be necessary and the perforations may be eliminated. We have further provided a method by which a plurality of plastic impregnated laminates may be simultaneously molded and cured to provide an article which resists penetration by flying fragments, projectiles and the like.

In the accompanying drawings which form part of the instant specification and which are to be read in conjunction therewith and in which like reference numerals are used to indicate like parts in the various views:

FIGURE 1 is a sectional view of our laminated plastic article with parts broken away, shown in a forming mold.

FIGURE 2 is a fragmentary sectional view drawn on an enlarged scale of our laminated plastic article, formed of four layers.

FIGURE 3 is a sectional view with a part broken away drawn on a reduced scale of another form of our laminated plastic article.

More particularly referring now to the drawings, our laminated plastic article includes a first laminate or layer 10 and a second layer or laminate 12. As shown, the laminated plastic article is being formed as a protective helmet. It will be appreciated, of course, that while a helmet has been shown, any article of protective armor or a protective storage container or the like may be formed.

Each of the layers or laminates 10 and 12 may be formed of any appropriate matted, felted, woven, or braided fibrous material. Preferably, we employ spun glass fibers, but other material such as nylon or the like may be used. These laminates are impregnated with a suitable thermoplastic or thermo setting material. For example, such materials as polyethylene plastic, allyl plastic, polystyrene plastic, phenol formaldehyde compound, urea formaldehyde resins or the like may be used. Preferably we employ a polyester resin, since this material may be cured at a temperature sufficiently low such that the film, to be described hereinafter, disposed between laminates will not fuse during curing.

In order to prevent the laminates from being bonded together over their entire contiguous surfaces during a curing operation, we dispose a thin film of non-adherent material 14 between adjacent laminates. This film may be any impervious material which remains flexible and does not fuse at the curing temperature employed. Such materials as cellophane, nylon, "Teflon," saran, cellulose acetate, or other such material may be used. "Teflon" is the registered trademark of E. I. du Pont de Nemours and Co. for a plastic consisting of a tetrafluoroethylene polymer. A thin metal film may also be used to separate adjacent laminates to prevent the formation of a continuous bond between adjacent laminates during a curing process. Preferably, we employ cellophane.

Where the configuration of the article being formed is such that the laminates would separate in the absence of a bond between adjacent laminates, we provide the film 14 with a number of spaced perforations 16. During the curing process some of the viscous plastic impregnating material flows through the holes 16. As a result, in the cured condition, a plurality of bonds 17 spaced over the surfaces of the laminates between adjacent laminates are provided. The spacing of these bonds 17 is such that adject laminates are firmly held in the assembled position. These bonds, however, cover only a minor portion of the surface between adjacent laminates to permit differential deflection between the laminates when the completed article is subjected to the force of impact of a flying fragment, projectile, or the like. The action of the plastic laminates and spaced bonds in resisting penetration is described more fully in our said copending application, above referred to.

While FIGURE 1 shows an article formed from only a pair of laminates 10 and 12 separated by a film 14, we preferably form an article of more than two laminates to increase their resistance to penetration. For example, as shown in FIGURE 2, the article may be formed of four plastic-impregnated laminates 18, 20, 22, and 24. Adjacent laminates are separated by thin films of cellophane or the like 26, 28, and 30. Each of the films 26, 28, and 30 is provided with holes 32 spaced over its area to provide bonds 33 between adjacent laminates when the assembly is cured. The holes may be of any convenient size or shape. They may be disposed in any desired pattern. It will readily be appreciated from an examination of FIGURE 2 on the construction there shown that the holes 32 of succeeding films 26, 28, and 30 are not aligned with each other. That is, the holes 32 of the film 28 are staggered with respect to the holes of the film 26. Similarly, the holes 32 of the film 30 are staggered with respect to the holes of film 28. This arrangement not only prevents the formation of a continuous column of plastic material through the wall of the article but also provides a vapor barrier for the wall.

It will be appreciated that each of the fibrous, plastic-impregnated laminates 10, 12, 18, 20, 22 and 24 is in some degree permeable, permitting the passage of water vapor therethrough. We have formed our article in a manner which prevents the transmission of vapor in any appreciable amount through the article wall. Each of the films 14, 26, 28, and 30, is, with the exception of the holes 16 and 32, impervious to the passage of vapor therethrough. In order to prevent the passage of vapor directly through the wall of the article, we have staggered the holes of succeeding laminates with respect to each other. We have thus provided a labyrinth packing forming a vapor barrier in the wall of the article. That is, the staggering of the holes of succeeding laminates with respect to each other provides only a circuitous or tortuous passage for vapor. No direct channel through the article wall exists. Moisture passing through the exterior laminate 24 will more probably encounter the impervious film 30 than a perforation 32. It must then pass along the surface of this film 30 and through a bond in a hole 32 before reaching the laminate 22. It cannot then pass directly through the laminate 22 to a hole 32 in the film 28, since the holes 32 in the respective films 30 and 28 are staggered with respect to one another. If it then travels along the surface of the film 28 to a hole 32, it cannot pass directly through the laminate 20 to a hole 32 in the film 26 since the holes of films 26 and 28 are staggered with respect to each other. It will be appreciated, therefore, that a substantial vapor barrier is provided to prevent moisture from penetrating the wall of the article. This feature is particularly advantageous when protective storage containers for equipment and the like are being formed.

In FIGURE 3 we have illustrated a modified form of article which is resistant to penetration by flying fragments, projectiles, and the like. It may readily be seen from the drawing that this article is formed with a re-entrant cross section. That is, the diameter of the mouth of the article is less than the longest inner diameter of the article. Such an article may conveniently be formed by employing a sectional female mold permitting removal of the formed article and an expansible bag for the male mold member as is known in the molding art. It will be appreciated that the re-entrant cross section provides a means for locking the laminates 34 and 36 in the assembled position. That is, since the shortest inner diameter of the laminate 34 is less than the longest outer diameter of the laminate 36, the laminates will not separate. In order to prevent the formation of a continuous surface between the laminates during curing, we interpose a film 38 of cellophane or the like between adjacent laminates. This film 38 may not be provided with perforations or holes such as holes 16 and 32. Such perforations are not necessary in this embodiment, since the laminates will not separate in ordinary use. The film 38, however, does permit differential deflection between the laminates so that the assembly resists penetration by flying fragments, missiles, or the like.

We have also invented an improved method of forming a laminated plastic article such as, for example, a protective helmet. Our method may be employed where it is necessary or desirable to form several laminates simultaneously. When a helmet or tube or other shaped article is being formed, this procedure becomes necessary. This method may be employed to form any article where it is desirable to take advantage of the economy of a single curing cycle. In employing our improved method we use a pair of complementary molds including a female mold 40 and a male mold 42. The female mold member 40 may conveniently be carried by a hollow piston (not shown) which cooperates with a fixed cylinder member (not shown) on which the male mold member 42 is mounted. The molding apparatus is provided with means (not shown) for controlling the temperature of the molds, means (not shown) for controlling the pressure in the molding space, and means (not shown) for moving the male and female molds into registry to complete the molding operation.

In our improved method we first deposit a mat of felted or interlaced fibrous material such as glass filaments or the like upon a mold form which may be the female mold member 40. The fibrous material is then impregnated with a suitable resin. As has been explained hereinbefore, preferably we employ a polyester resin. It is to be understood, of course, that the fibrous mat may first be impregnated and then placed in the mold form in an uncured or partially cured condition. We then place a thin film 14 of flexible material such as cellophane, nylon, or the like over the green impregnated glass fiber layer 10. The film 14 forms a separator between adjacent laminates so that the impregnated laminates may be cured without forming a continuous bond over the entire surface between adjacent laminates. This film is advantageously formed with perforations 16 which provide bonds between adjacent fibrous laminates 10 and 12 as pointed out above. We next dispose a second layer or laminate 12 of fibrous material over the thin film 14. This layer may be pre-impregnated with resin or it may be impregnated with resin after being placed over the film 14. It is to be understood that we may employ any convenient number of fibrous laminates, adjacent laminates of which are separated by thin flexible films. The material of which the film is formed must, of course, be such as will be unaffected by the temperatures employed during the curing of the green laminates.

When a stack of separated laminates of a sufficient number to form the desired wall thickness have been placed in the mold 40, the male mold 42 is brought into registry with the mold 40 and the assembly is cured at the proper temperature and pressure which will depend upon the particular impregnating resin employed. During the curing operation, the resin with which the laminates have been impregnated flows into the perforations 16 so that when the assembly is cured, spaced bonds 17 are provided over a minor portion of the surface between adjacent layers or laminates. After the curing operation has been completed, the male mold 42 is moved out of the female mold 40 and the formed article may be removed.

While we have shown in FIGURE 1 a helmet being formed, it is to be understood that this showing is by way of example only. Our method is applicable to any article such as a tube or the like where it is necessary or desirable to form several laminates simultaneously.

When our method is used to form an article having a cross sectional shape which is re-entrant, such as the article shown in FIGURE 3, a sectional female mold (not shown) is employed. The mold is first assembled and the laminate 34, the film 38, and the laminate 36 are successively disposed in the mold. A suitable expansible bag (not shown) forms the male mold member. This bag is expanded within the interior of the female mold to press the material against the inner surface of the female mold and the molding operation is completed under the required pressure at an appropriate temperature. In order to remove the article, the bag is collapsed and withdrawn from the interior of the female mold. Since the molding apparatus is known to the art, it is not here shown or described in detail. The female mold is then disassembled and the article removed. It is to be noted that in molding an article such as is shown in FIGURE 3, it is not necessary to employ a film with perforations. The nested laminates 34 and 36 will not separate, since the inner diameter of the mouth of the laminate 34 is less than the longest outer diameter of the laminate 36.

When our laminated plastic article is employed to protect personnel or material, its penetration-resisting quality is provided by the differential deflection between adjacent laminates. That is, when a flying fragment or projectile strikes the surface of the article the respective laminates tend to deflect differentially with respect to one another. This tendency is resisted by the spaced bonds provided between adjacent laminates. The bonding over the surface between the laminates, however, is such that the bonds break to permit differential deflection before an individual laminate shears. This differential deflection to resist penetration is explained more fully in our co-pending application, Serial No. 265,598, identified above.

While we have shown in FIGURES 1 and 3 an article formed of only two laminates separated by a thin film, we preferably form an article with more layers than two. A fragmentary section of an article formed with four layers is shown in FIGURE 2. As has been explained hereinbefore, an article so formed has a wall which forms a labyrinth packing to resist the penetration of moisture into the interior of the article. That is, a vapor barrier provided by the circuitous passage which vapor must travel in passing from laminate to laminate through the wall of the article. This feature is of particular importance when forming containers for protecting materiel.

It will be seen that we have accomplished the objects of our invention. We have provided a laminated plastic article which is light in weight, which is less bulky than similar plastic articles of the prior art, and yet which has superior missile penetration-resisting or ballistic qualities. Our article also resists the passage of moisture through its walls. We have also provided an improved method of forming a laminated plastic article when it is necessary or desirable to form several laminates simultaneously. By use of our method we may form several laminates simultaneously and yet prevent a complete bonding between adjacent laminates over the entire surface between laminates. At the same time, our method permits the formation of spaced bonds over a minor portion of the surface between adjacent laminates. These spaced bonds hold the laminated assembly together during ordinary use while permitting differential deflection between adjacent laminates when a flying fragment or projectile impinges on the surface of the article.

It is to be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A laminated plastic article including in combination a pair of fibrous layers impregnated with a synthetic resin, a thin smooth film of material nonadherent with respect to said layers and impervious to said resin in its uncured state separating said layers, the surfaces of said film being free with respect to said layers to permit relative movement between the layers, said thin film being provided with perforations spaced over its surface and bonds of synthetic resin passing through said perforations for securing said layers to each other to permit them to deflect differentially with respect to each other under the impact of a missile.

2. A laminated plastic article including in combination a plurality of fibrous laminates impregnated with a synthetic resin, a plurality of thin smooth films of material nonadherent with respect to said laminates and impervious to said resin in its uncured state separating adjacent ones of said laminates, the surfaces of said films being free with respect to said laminates to permit relative movement between the laminates, each of said films being provided with spaced perforations and bonds formed of said impregnating synthetic resin passing through said perforations for securing adjacent laminates to one another at separated points, the aggregate area through which the laminates are secured being small with respect to the remainder of the surface area of the laminates, which remainder area is free of securing bonds to permit the laminates to deflect differentially with respect to one another under the impact of a missile.

3. A laminated plastic article including in combination a plurality of fibrous laminates impregnated with a synthetic resin, a plurality of thin smooth films of material nonadherent with respect to said laminates and impervious to said resin in its uncured state, separating adjacent ones of said laminates, the surfaces of said films being free with respect to said laminates to permit relative movement between the laminates, each of said films being provided with spaced perforations and means for securing adjacent laminates to one another through said perforations, the aggregate area through which the laminates are secured being small with respect to the remainder of the surface area of the laminates to permit the laminates to deflect differentially with respect to one another under the impact of a missile.

4. A laminated plastic article as in claim 3 wherein said means for securing adjacent laminates to one another is a plurality of bonds formed of said impregnating synthetic resin.

5. A laminated plastic article as in claim 3 including at least a pair of said thin films each formed with spaced perforations, the perforations of one of said films being staggered with respect to the perforations of the other of said films.

6. A laminated plastic article as in claim 3 wherein fibrous laminates are formed of glass fibers.

7. A laminated plastic article as in claim 3 wherein said synthetic resin is a polyester resin.

8. A laminated plastic article as in claim 3 wherein said thin films are formed of cellophane.

9. A laminated plastic article as in claim 3 wherein said article is formed with a mouth having a diameter which is shorter than the longest inner diameter of the article.

References Cited in the file of this patent

UNITED STATES PATENTS

| | | |
|---|---|---|
| 1,452,039 | Gravell | Apr. 17, 1923 |
| 1,962,584 | Davies | June 12, 1934 |
| 2,142,463 | Upson | Jan. 3, 1939 |
| 2,340,546 | Meaker | Feb. 1, 1944 |

(Other references on following page)

UNITED STATES PATENTS

| | | |
|---|---|---|
| 2,395,077 | Southwick | Feb. 19, 1946 |
| 2,401,281 | Webb | May 28, 1946 |
| 2,415,032 | Edgar et al. | Jan. 28, 1947 |
| 2,425,805 | Hyman | Aug. 19, 1947 |
| 2,439,137 | Keller | Apr. 6, 1948 |
| 2,451,483 | Goldsmith | Oct. 19, 1948 |
| 2,465,257 | Nebesar | Mar. 22, 1949 |
| 2,562,951 | Rose et al. | Aug. 7, 1951 |
| 2,563,923 | Crosby | Aug. 14, 1951 |
| 2,640,987 | Ehlers | June 9, 1953 |
| 2,650,184 | Biefeld | Aug. 25, 1953 |
| 2,655,459 | Gordon et al. | Oct. 13, 1953 |
| 2,713,016 | Weiss | July 12, 1955 |